(12) United States Patent
Ikeda

(10) Patent No.: US 7,474,365 B2
(45) Date of Patent: Jan. 6, 2009

(54) LIQUID-CRYSTAL DISPLAY DEVICE AND SURFACE-ILLUMINANT DEVICE

(75) Inventor: Mitsutake Ikeda, Saitama (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 392 days.

(21) Appl. No.: 11/331,218

(22) Filed: Jan. 13, 2006

(65) Prior Publication Data
US 2006/0176416 A1 Aug. 10, 2006

(30) Foreign Application Priority Data
Jan. 14, 2005 (JP) .............................. 2005-008394

(51) Int. Cl.
*G02F 1/1335* (2006.01)
(52) U.S. Cl. .......................... 349/58; 349/65
(58) Field of Classification Search ................ 349/58
See application file for complete search history.

(56) References Cited
U.S. PATENT DOCUMENTS
5,666,172 A * 9/1997 Ida et al. ...................... 349/58
7,221,414 B2 * 5/2007 Nishiura et al. ............... 349/58

FOREIGN PATENT DOCUMENTS
JP         2002-91330          3/2002

\* cited by examiner

*Primary Examiner*—Richard H Kim
(74) *Attorney, Agent, or Firm*—Oblon, Spivak, McClelland, Maier & Neustadt, P.C.

(57) ABSTRACT

A liquid crystal display (LCD) device or a surface-illuminant devices employed therein comprising: a rectangular light-guide plate having a first main face as a light-emitting face, a second main face opposed to the first face and side faces disposed between the first and second faces; a light source disposed along at least one of said side faces; and a metal plate which covers said second face and a fringe of which extends along the light source, and contour of the metal plate being designed so as not to be overlapped with a driver circuit board which is to be placed along a back face of the light-guide plate.

2 Claims, 4 Drawing Sheets

LIQUID-CRYSTAL DISPLAY DEVICE AND SURFACE-ILLUMINANT DEVICE

CROSS-REFERENCE TO RELATED APPLICATION

This application is based upon and claims the benefit of priority from the prior Japanese Patent Application No. 2005-8394, filed on Jan. 14, 2005; the entire contents of which are incorporated herein by reference.

TECHNICAL FIELD

The invention relates to liquid-crystal display devices and to surface-illuminant devices employed therein.

BACKGROUND ART

Liquid crystal display (LCD) devices and other flat-panel display devices have recently been used as image display devices for television sets, personal computers in various kinds, car navigation devices and so on; in view of advantageous features of the flat-panel display devices, such as small depth dimension and small weight as well as small electric power consumption.

A light transmissive one of the LCD devices is for instance formed of; a liquid-crystal display panel in which liquid crystal layer is sandwiched by a pair of transparent substrates, and a surface-illuminant device disposed on backside, or non-displaying main face, of the liquid-crystal display panel as a light source for the display panel.

The surface-illuminant devices may be roughly classified into two categories; one is "direct backlight" in which a plurality of tube-shaped light sources such as fluorescent lamps arranged side by side at backside of the display panel; and the other is "edge-lit backlight" in which one or more tube-shaped light source is disposed to be in proximity along one or more edge of the light-guide plate as to emit light from a front-side main face of the light-guide plate.

In order to achieve smaller depth dimension and smaller weight of the LCD devices, depth dimension of the surface-illuminant devices have to be smaller. Thus, the "edge-lit backlights" have been prevalently used. The edge-lit backlight is for instance formed as follows. The light-guide plate is formed of a thin plate of acrylic resin or the like whose back face is printed with a light scattering pattern of milk-white appearance; and thereby, light-source light enters through an edge face of the light-guide plate and propagated through the plate, as to be emitted from front main face of the light-guide plate while being scattered by the light-scattering pattern on the back face of the plate.

The tube-shaped light source itself emits the light-source light through all around of the light-emitting surface, thus, a reflective element or a lamp reflector is arranged as to lead the light toward the edge face of the plate. The reflective element is usually formed of a film having a metal layer on a surface or a metal plate or formed of other electroconductive materials. The tube-shaped light source is generally formed of a fluorescent lamp such as a cold cathode fluorescent lamp. Thus, light-emitting efficiency declines when temperature of the lamp rises excessively; in an occasion of achieving high-brightness displaying as to increase heat generation. Moreover, local temperature rise in the liquid-crystal display plate may cause display unevenness. In view of the above, JP-A-2002-091330 (Japan Patent Application Publication No. 2002-091330) proposes disposing of a metal heatsink plate along back face of the light-guide plate as to dissipate the heat of the lamp reflector.

Nevertheless, such disposing of the metal heat-sink plate along back face may lead enhancement of level of electromagnetic noise because; the electromagnetic noise is transmitted from driver circuit board disposed along a back face of the metal heatsink plate to the heatsink plate and is propagated through the heat-sink plate. In view of the above, it is aimed to avert trouble of electromagnetic noise while achieving easy and reliable dissipation of heat from the light source.

BRIEF SUMMARY OF THE INVENTION

Invention-wise LCD device is comprised of: a rectangular light-guide plate having a first face as a light-emitting face, a second face opposed to the first face and edge faces disposed between the first and second faces; a light source disposed along at least one of said edge faces; a liquid-crystal display panel disposed as facing said first face; a driver circuit board disposed along said second face; and a metal plate which covers said second face and a fringe of which is arranged to run along the light source, and contour of the metal plate being designed so as not to be overlapped with the driver circuit board.

Invention-wise surface-illuminant device is comprised of: a rectangular light-guide plate having a first face as a light-emitting face, a second face opposed to the first face and edge faces disposed between the first and second faces; a light source disposed along at least one of said edge faces; and a metal plate which covers said second face and a fringe of which extends along the light source, and the metal plate being designed so as not to cover a region on said second face, which is to be mounted with a driver circuit board and is furthermost from the light source.

By the above construction, generation of the electromagnetic noise by way of the metal heatsink plate is curbed while keeping satisfactory dissipation of the heat from the light source. Moreover, weights of the LCD device and the surface illuminant device, as well as material cost, are decreased by an extent that areal size of the metal plate is decreased.

DETAILED DESCRIPTION OF THE INVENTION

Figure 1:
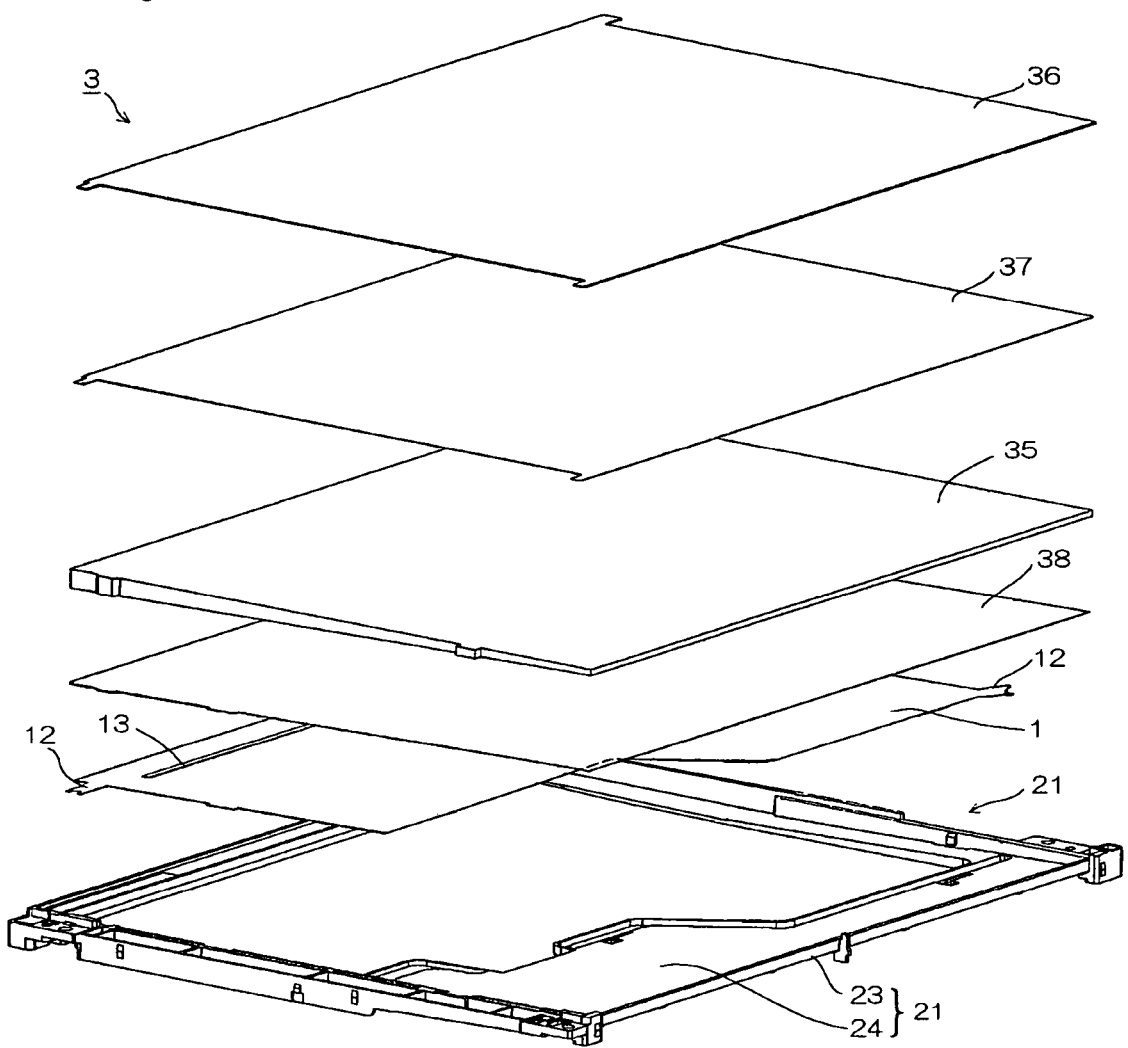
FIG. 1 is an exploded perspective view showing a surface-illuminant device of the embodiment.
Figure 2:
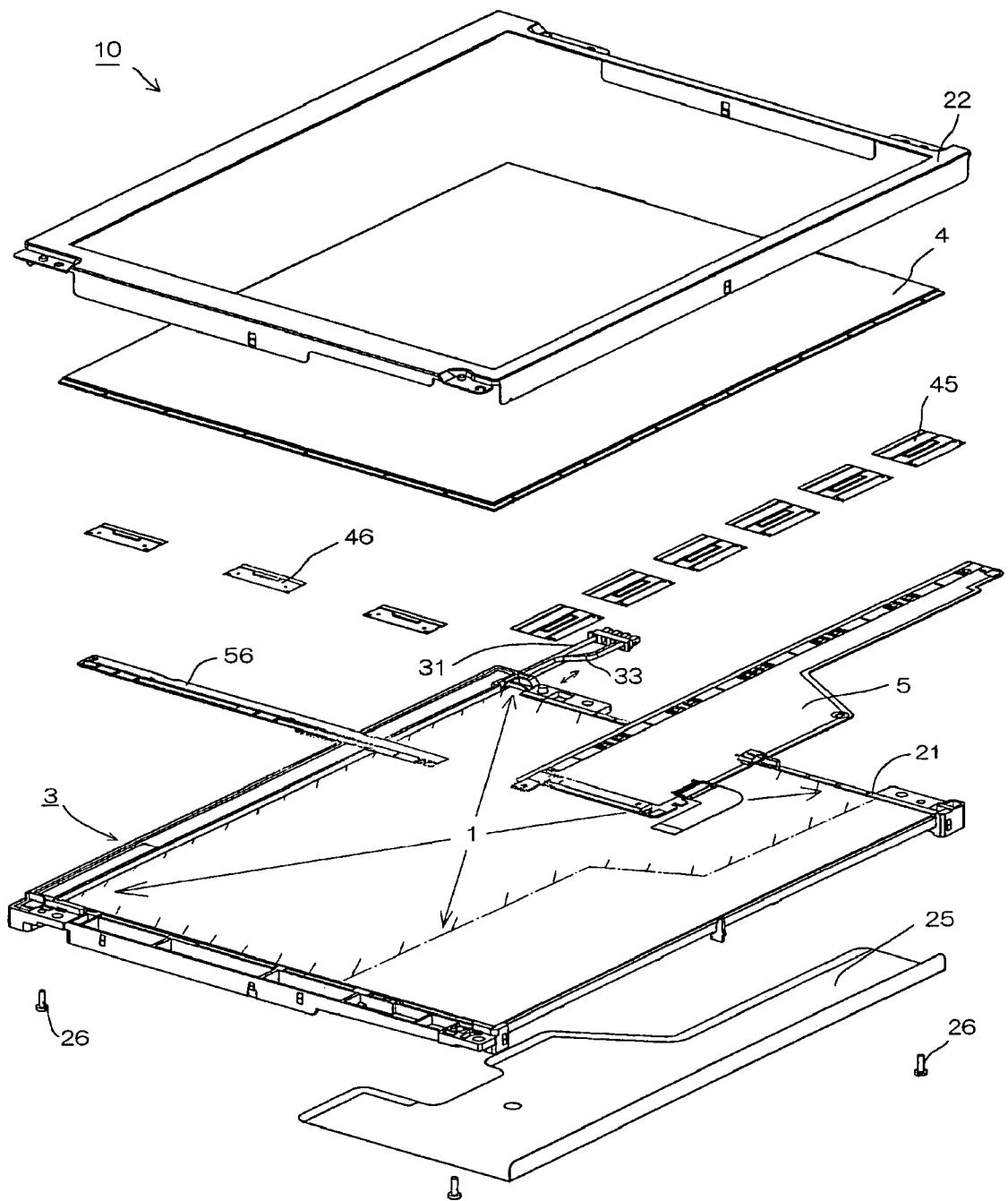
FIG. 2 is an exploded perspective view showing an LCD device including the surface-illuminant device of the FIG. 1.

An embodiment of the present invention will be described with reference to FIGS. 1 through 4. As shown in FIG. 2, the LCD device 10 is formed of; a surface-illuminant device 3, a liquid-crystal display panel 4 (hereinafter referred as display panel), a driver circuit board (printed circuit board or PCB) 5 and a framework 2 containing and holding hereto-mentioned three parts or devices. The framework 2 is formed of a resin frame 21 at backside and a picture-frame-shaped metal frame 22 on front side, which is often and hereinafter referred as "bezel cover". When the resin frame 21 and the bezel cover 22 are fixed as screwed with each other, the surface-illuminant device 3 and the display panel 4 are sandwiched as held together.

Figure 4:
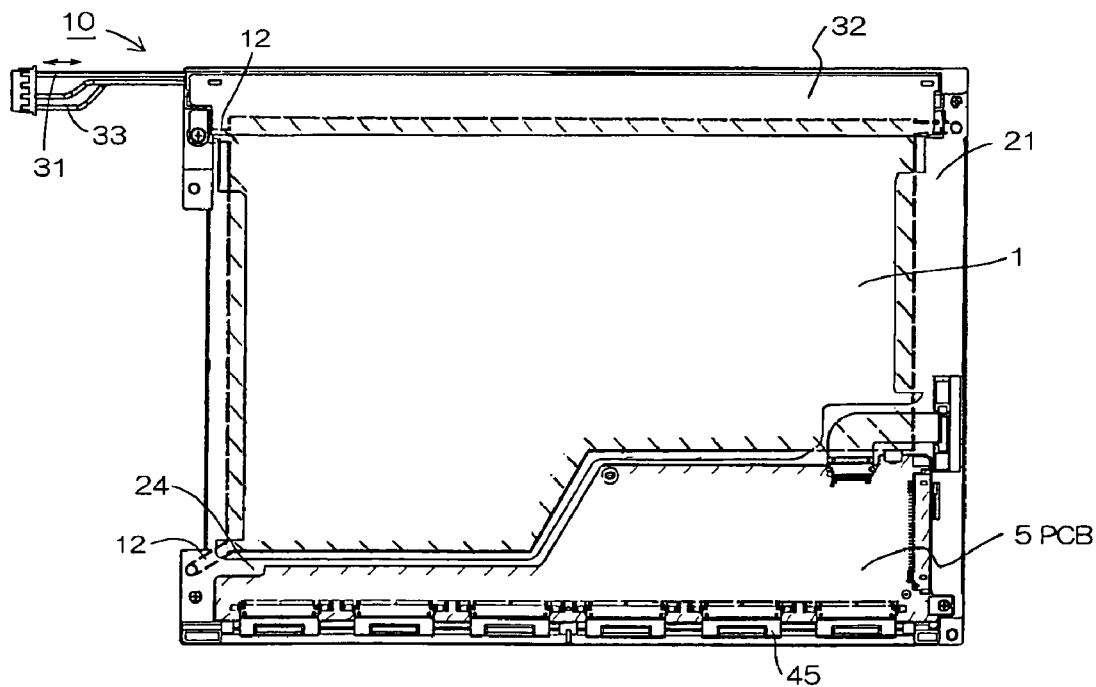
FIG. 4 is a bottom plan view showing the LCD device of the FIG. 2, in which the metal heatsink plate and the driver circuit board are indicated by slashed fringes.

As shown in FIG. 2, the bezel cover 22 is shaped and constructed in a manner that four angle bars of substantially L-shaped cross section are combined together as to match four edge faces of the LCD device 10 and fringe parts of light-emitting face on the LCD device 10. Meanwhile, the resin frame 22 is comprised of: a rectangular-rim-shaped beam 23, each portion of which has a substantially L-shaped cross section and which matches four edge faces of the LCD device and fringe parts of back face on the LCD device 10; and a circuit-board receiving shelf 24 for mounting a driver circuit board 5 along back face of the light-guide plate 35. As shown in FIGS. 2 and 4, the driver circuit board 5 is electrically and mechanically connected through tape carrier packages (TCPs) 45 each mounted with a driver IC, to a fringe terminal area of the display panel 4; which area is on a shelf-shaped protrusion of array substrate out of a fringe of the counter substrate, and is extended along a one long side of rectangle of or X-fringe of the display panel. In an assembling process, after processes for such connection through TCPs 45, the TCPs 45 are bent and folded so that the driver circuit board 5 is placed along a back face of the light-guide plate 35.

The surface-illuminant device 3 is comprised of: the rectangular light-guide plate 35; a tube-shaped light source 31 that is disposed along a fringe opposed to and distant from the driver circuit board 5, of the light-guide plate 3; and a lamp reflector 32 illustrated in FIG. 4, which has a substantially angled C-shaped cross section as to guide the light from the tube-shaped light source 31 to an edge face of the light-guide plate 35. The lamp reflector 32 is formed of metal and preferably formed of aluminum metal or its alloy as to achieve good heat conductivity and light weight. In an illustrated example, the tube-shaped light source 31 extending along a straight line may be pulled out along with wire harnesses 33 by grasping and pulling a lamp socket of the light source 31, as to be replaceable with new one along with the wire harnesses.

Meanwhile, the light-emitting face, which faces the display panel, of the light-guide plate 35 is overlaid with two prism sheets 36 and 37; and the back face of the light-guide plate 35 is covered by a reflective sheet 38. On backside of the reflective sheet 38, there is disposed a metal heatsink plate 1 for dissipating the heat from the tube-shaped light source 31. In respect of the metal heatsink plate 1, its fringe portion along the light source 31 is directly overlapped with a fringe portion of the lamp reflector 32 so that heat of the light source 31 is transmitted to the heatsink plate 1 chiefly through the lamp reflector 32 and then propagated through the heatsink plate 1 toward its fringe distant to the light source 31. The heatsink plate 1 is preferably formed of aluminum metal or its alloy, in same manner with the lamp reflector 2.

As shown in FIGS. 1 through 4, the heatsink plate 1 is shaped and constructed as not to cover whole of the back face of the light-guide plate 35 and as to cover an area on the back face other than a region 11 overlaid with the circuit-board receiving shelf 24. In other words, the heatsink plate 1 shaped and constructed in a manner that a rectangular metal plate matching the back face of the light-guide plate 35 is cut out along a contour of the driver circuit board 5, at a region in vicinity of the light-guide plate's fringe opposed to the light source 31. In a detailed example, as shown in FIG. 4, a fringe of the metal heatsink plate 1 is arranged as spaced apart from the contour of the driver circuit board 5, with a predetermined and substantially constant distance.

By the above construction, the electromagnetic noise generated on the driver circuit board 5 was hardly transferred or propagated to the heatsink plate 1, as to sufficiently curb the noise. Meanwhile, efficiency of dissipation of the heat was not diminished in a way expected from decrease of an areal size of the heatsink plate by the fore-mentioned cutout; and the efficiency does not make considerable difference with an occasion where the metal heatsink plate covers whole back face of the light-guide plate 35. Further by the above construction, weight of the heatsink plate 1 is decreased in an extent of the cutout or region corresponding to the driver circuit board 5; and resultantly, weight and material cost of the LCD device 10 is decreased.

Figure 3:
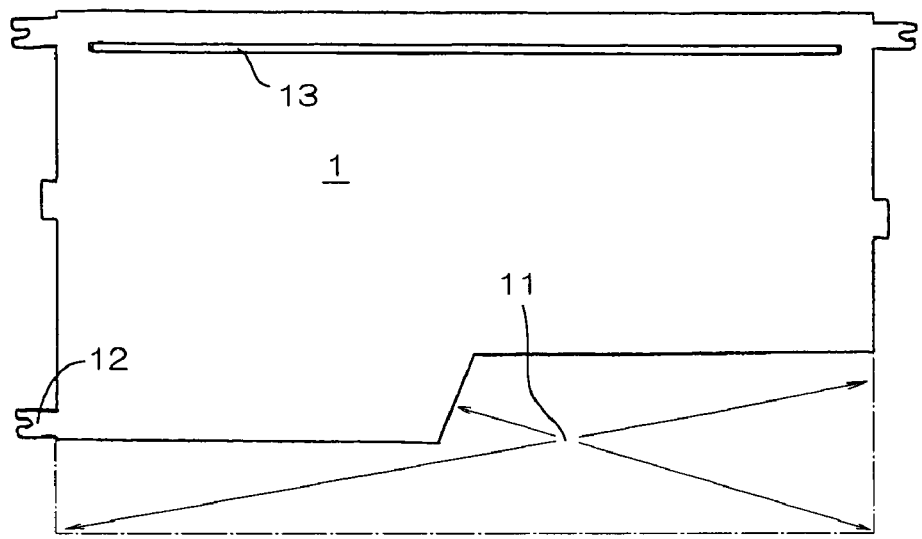
FIG. 3 is a plan view showing a metal heatsink plate included in the surface-illuminant device of the FIG. 1.

In an illustrated example, the driver circuit board 5 is shaped and constructed in such a manner that a broad-width rectangular part and a smaller-width rectangular part are combined together through a trapezoidal transition area. Outward fringe of the driver circuit board 5 substantially coincides with and runs along a contour or an edge face of the light-guide plate 35; and an inward fringe, nearer to the light source 31, of the light-guide plate 35 follows a stair case pattern. The metal heatsink plate 1 has three strip-shaped tabs 11 each projected outwardly from three corners of the plate 1. The tabs 12 arranged as to be sandwiched between the resin frame 21 and bezel cover 22 when these are fixed together by screws 26. The tabs 12 on three corners of the heatsink plate 1 facilitate positional fixing of the heatsink plate 1 when the LCD device 10 is assembled; and in same time, the tabs 12 realize direct contacting of the heatsink plate 1 with the bezel cover 11 and thereby, grounding of the heatsink plate 1. In an illustrated example, the each tab has a semicircular or semioval indent at distal end thereof as to fit on a shaft of the screw 26. The tabs 12 may be formed integrally with other part of the heatsink plate at a process of punching a metal plate. The metal heatsink plate 1 also has a reinforcing flute 13 formed by press working, at a place along the light source 31, as shown in FIGS. 1 and 3.

In a detailed example in dimensional construction of the above embodiment, the distance D between the heatsink plate 1 and the driver circuit board 5 is 5 to 15 mm, and is 10 mm for example while thickness of the heatsink plate 1 is 0.1 to 0.5 mm, and is 0.2 mm for example. In the detailed example, length dimension of the heatsink plate 1 excluding the tabs 12 is substantially same with that of the light-guide plate 35.

Incidentally and additionally, a connector wiring board 56 having an elongated contour is disposed along a short side of the rectangle of or Y-fringe of the display panel; and is placed along the backside of the heatsink plate 1. The connector wiring board 56 is electrically and mechanically connected to a fringe terminal area along a short side of the rectangle, on the display panel, through TCPs 46. The connector wiring board 56 is electrically connected to the driver circuit board 5 through a flexible wiring board or the like. As shown in FIG. 3, the connector wiring board 56 overlaps the heatsink plate 1; however, electromagnetic noise thereby transmitted to the heatsink plate 1 was at an extent taken to be insignificant. Meanwhile, as shown in FIG. 2, the driver circuit board 5 is covered from backside by metal cover 25 so that the electromagnetic noise is further curbed.

Figure 5:
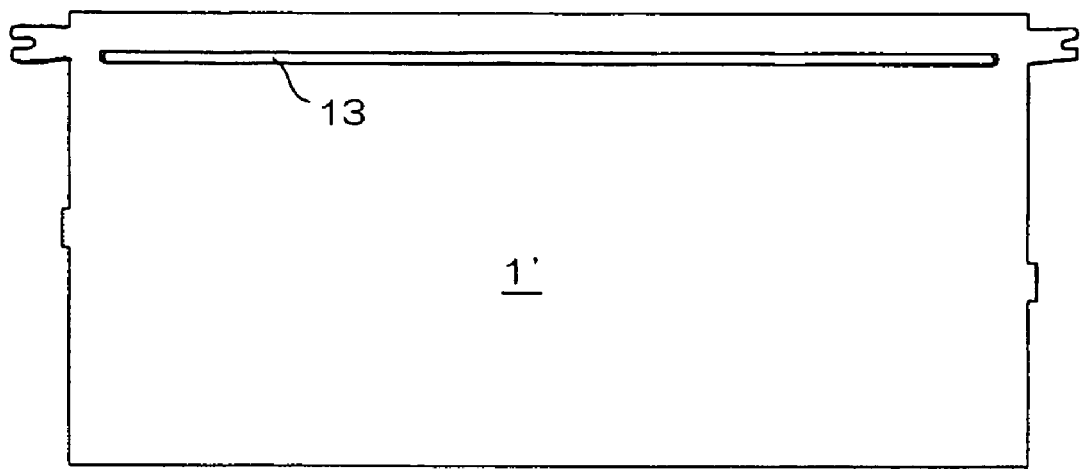
FIG. 5 is a plan view in same manner with the FIG. 3, showing a metal heatsink plate in a modification to the embodiment.

FIG. 5 shows a construction of a heatsink plate 1' in a modification to the embodiment. In the modification, the heatsink plate is configured as a rectangle and its fringe distant to the light source 31 is spaced apart from an outline of the broad-width part of the driver circuit board 5. The tabs 12 for the grounding are arranged only at two sites respectively in vicinity of two ends of the tube-shaped light source 31. Also by this construction, resulted heat dissipation efficiency was almost same to that of the above-mentioned embodiment; and the resulted effect of reducing the electromagnetic noise was exactly same to the embodiment. In same time, by an extent of reducing the aerial size of the heatsink plate, the weight and material cost for the LCD device 10 is decreased.

In the above, explanations are made in such a manner that the heatsink plate and the lamp reflector are separately formed; nevertheless, they may be formed integrally with each other. In view of cost of working, separate forming of the mispreferable in general. A fringe of the heatsink plate formed separately to the lamp reflector may be extended out of an edge of the light-guide plate to reach backside of tube-shaped light source. Also in the above, the explanations are made in such a manner that the tube-shaped light source is disposed only at along a long side of rectangular contour of the light-guide plate; however, the tube-shaped light source may be L-shaped one that is arranged along two sides of the rectangular contour. In such occasion, if the driver circuit board is disposed along one corner of the LCD device so as to be spaced apart from the L-shaped light source, the heatsink plate is cut out or omitted at such region having the driver circuit board.

Figure 6:
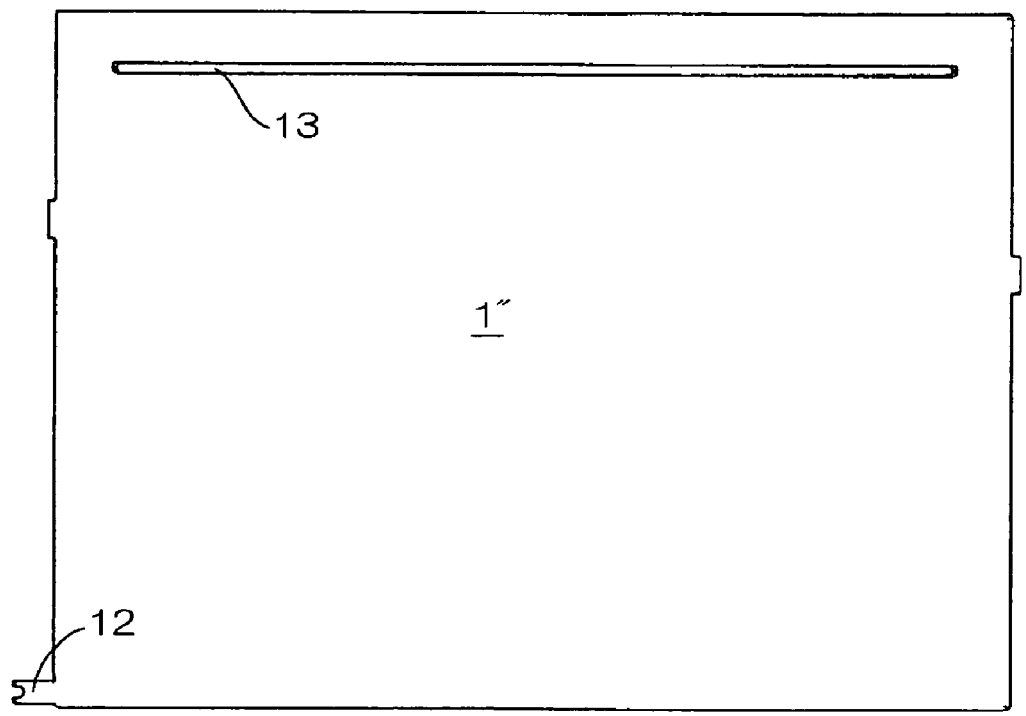
FIG. 6 is a plan view in same manner with the FIG. 3, showing a metal heatsink plate in a comparative example.

FIG. 6 shows a metal heatsink plate 1″ of a comparative example. When such metal heatsink plate was employed in an LCD device, the electromagnetic noise from the driver circuit board was observed although heat dissipation efficiency was satisfactory.

What is claimed is:

1. A liquid-crystal display device comprising:
a rectangular light-guide plate having a first face as a light-emitting face, a second face opposed to the first face and edge faces disposed between the first and second faces;
a light source disposed along at least one of said edge faces;
a liquid-crystal display panel disposed as facing said first face;
a driver circuit board disposed along said second face;
a metal plate which covers said second face and a fringe of which is arranged to run along the light source, and contour of the metal plate being designed so as not to be overlapped with the driver circuit board;
a resin frame containing at least the light-guide plate, the light source and the metal plate;
a metal frame holding the liquid-crystal display panel as to be sandwiched between the resin and metal frames; and
protrusions which are disposed on and outwardly extended from contour of the metal plate and are sandwiched between the resin and metal frames.

2. A liquid-crystal display device comprising:
a rectangular light-guide plate having a first face as a light-emitting face, a second face opposed to the first face and edge faces disposed between the first and second faces;
a light source disposed along at least one of said edge faces;
a liquid-crystal display panel disposed as facing said first face;
a driver circuit board disposed along said second face;
a metal plate which covers said second face and a fringe of which is arranged to run along the light source, and contour of the metal plate being designed so as not to be overlapped with the driver circuit board; and
a metal reflector element which covers periphery of the light source and collects light from the light source toward the edge face; and the metal reflector being formed separately from the metal plate and partly overlapped with the metal plate.

* * * * *